US009728222B1

(12) United States Patent
Biskeborn et al.

(10) Patent No.: US 9,728,222 B1
(45) Date of Patent: Aug. 8, 2017

(54) REVERSE READ BIAS FOR DRIVE PERFORMANCE AND SENSOR STABILITY

(71) Applicant: International Business Machines Corporation, Armonk, NY (US)

(72) Inventors: Robert G. Biskeborn, Hollister, CA (US); Ho-Yiu Lam, Mountain View, CA (US); Jason Liang, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/159,621

(22) Filed: May 19, 2016

(51) Int. Cl.
| G11B 27/36 | (2006.01) |
| G11B 5/09 | (2006.01) |
| G11B 20/10 | (2006.01) |
| G11B 5/008 | (2006.01) |

(52) U.S. Cl.
CPC .... *G11B 20/10305* (2013.01); *G11B 5/00813* (2013.01); *G11B 5/09* (2013.01)

(58) Field of Classification Search
CPC ............... G11B 2220/90; G11B 27/36; G11B 20/10009; G11B 5/09; G11B 5/012; G11B 5/00; G11B 2005/0021; G11B 5/314
USPC ......... 360/66, 46, 68, 31, 59, 55, 64, 27, 39
See application file for complete search history.

(56) References Cited

U.S. PATENT DOCUMENTS

| 5,661,614 | A | 8/1997 | Wallash et al. |
| 6,122,818 | A | 9/2000 | Lee |
| 6,373,647 | B1 | 4/2002 | Baker |
| 6,606,216 | B1 | 8/2003 | Liikanen et al. |
| 7,113,355 | B2 | 9/2006 | Hidaka |
| 9,153,249 | B1 * | 10/2015 | Oenning ................ G11B 5/035 |
| 9,336,803 | B1 * | 5/2016 | Wilson ..................... G11B 5/03 |
| 2003/0043489 | A1 | 3/2003 | Lee et al. |
| 2006/0119963 | A1 | 6/2006 | Hidaka |
| 2009/0268325 | A1 | 10/2009 | Iben et al. |
| 2012/0019945 | A1 | 1/2012 | Chan et al. |

FOREIGN PATENT DOCUMENTS

EP          1469322 A2      10/2004

OTHER PUBLICATIONS

Icko, "A Thermodynamic Study of ESD and EOS Induced Pinned Layer Reversal in GMR Sensors," EOS/ESD Symposium 09-230, 2009, pp. 1-10.

* cited by examiner

*Primary Examiner* — Nabil Hindi
(74) *Attorney, Agent, or Firm* — Zilka-Kotab, P.C.

(57) ABSTRACT

In one general embodiment, an apparatus includes a plurality of read transducers arranged in an array, and a plurality of biasing circuits. Each biasing circuit is coupled to a unique one of the read transducers. Each biasing circuit is configured to selectively reverse a direction of a read current applied to the read transducer associated therewith.

20 Claims, 11 Drawing Sheets

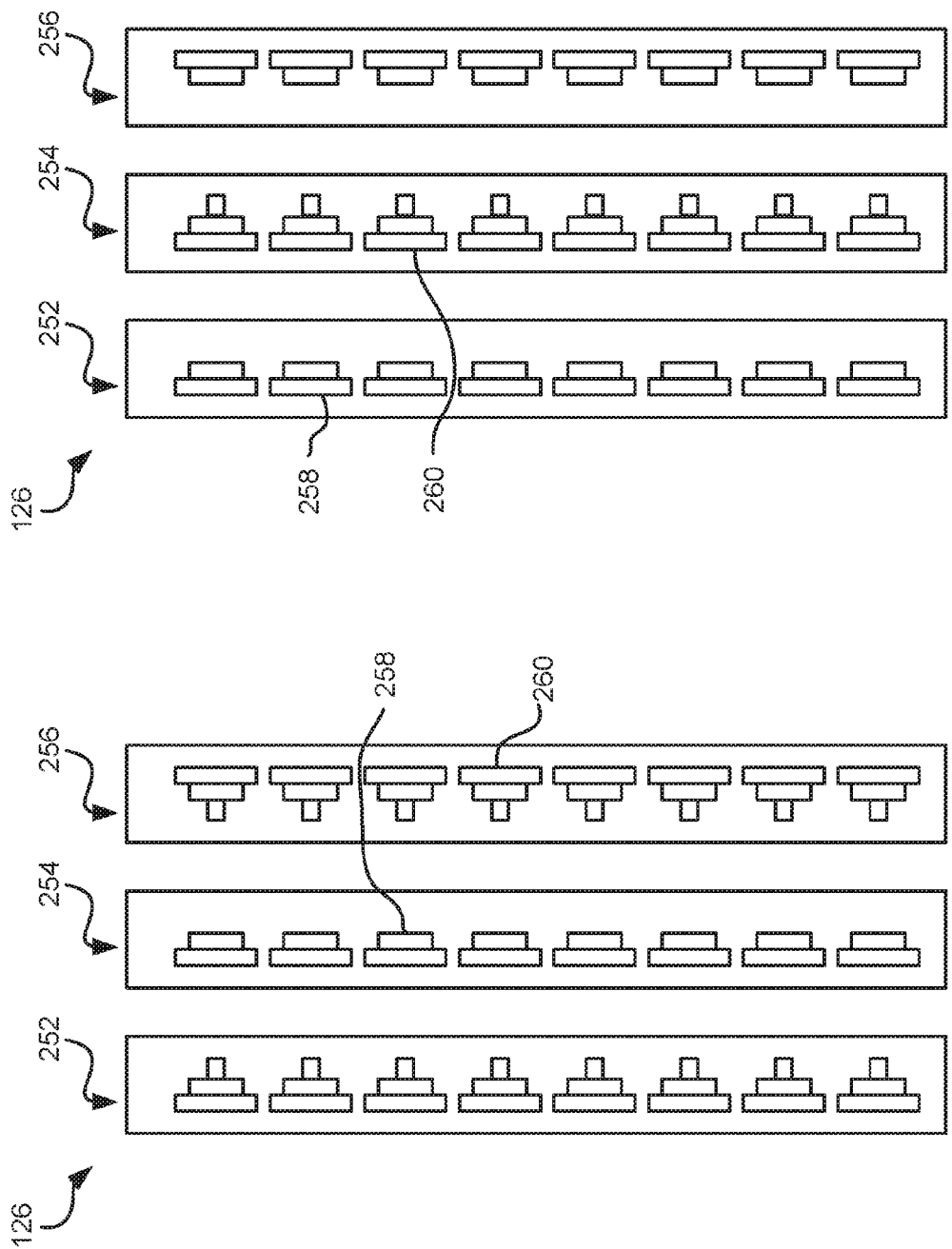

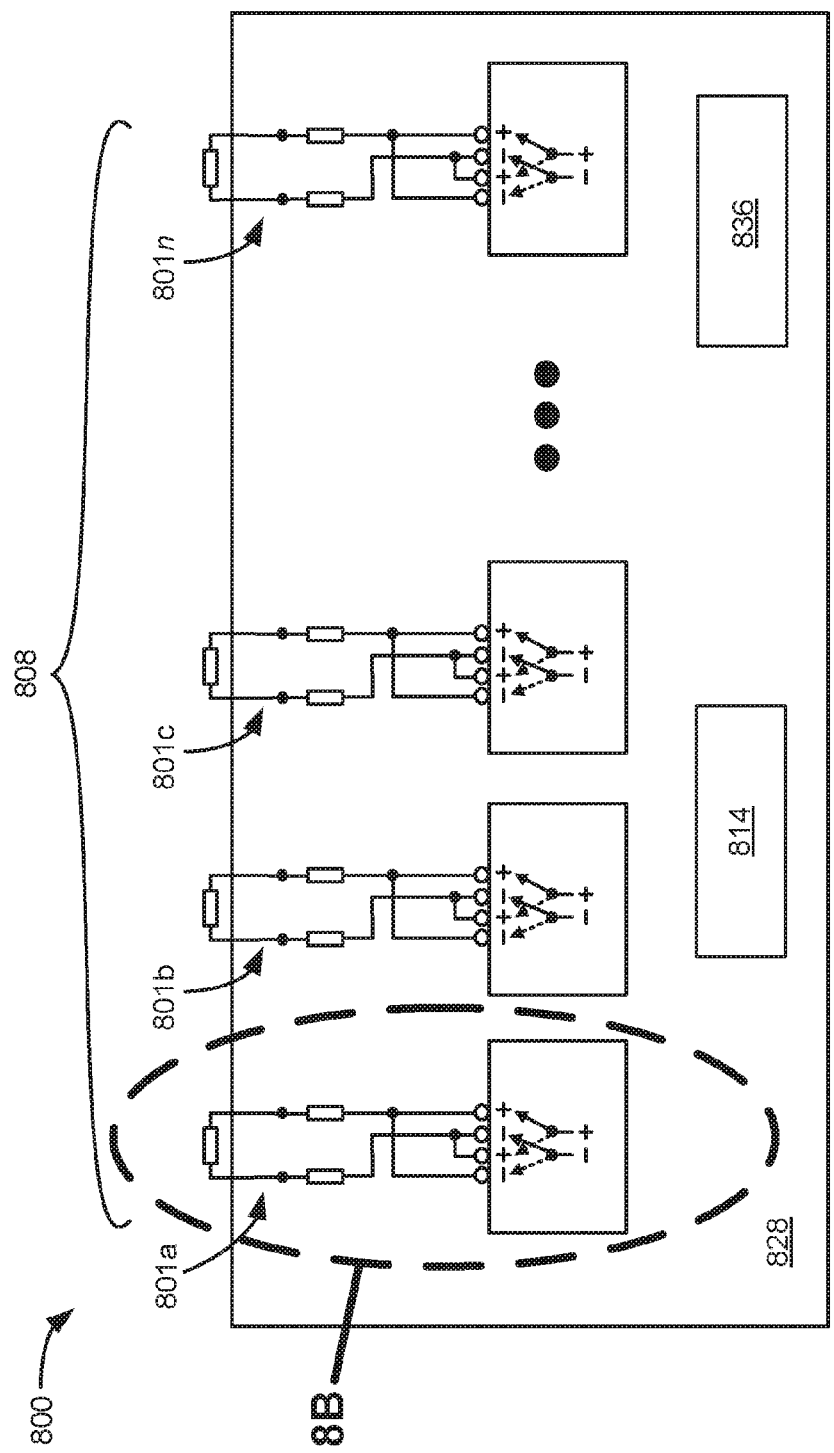

REVERSE READ BIAS FOR DRIVE PERFORMANCE AND SENSOR STABILITY

BACKGROUND

The present invention relates to data storage systems, and more particularly, this invention relates to the biasing circuits of magnetoresistive heads.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, the drive moves the magnetic tape over the surface of the tape head at high speed. Usually the tape head is designed to minimize the spacing between the head and the tape. The spacing between the magnetic head and the magnetic tape is crucial and so goals in these systems are to have the recording gaps of the transducers, which are the source of the magnetic recording flux in near contact with the tape to effect writing sharp transitions, and to have the read elements in near contact with the tape to provide effective coupling of the magnetic field from the tape to the read elements.

SUMMARY

An apparatus according to one embodiment includes a plurality of read transducers arranged in an array, and a plurality of biasing circuits. Each biasing circuit is coupled to a unique one of the read transducers. Each biasing circuit is configured to selectively reverse a direction of a read current applied to the read transducer associated therewith.

A drive-implemented method according to one embodiment includes performing a read operation on a magnetic recording tape, and detecting an abnormality associated with a read transducer in an array of read transducers being used to perform the read operation. In response to detecting the abnormality, the read transducer associated with the abnormality is identified. A direction of a read current passing through the read transducer associated with the abnormality is reversed, and the read operation on the magnetic recording tape is continued or resumed using the read current in the reverse direction through the read transducer associated with the abnormality. A determination is made as to whether reversing the direction of the read current improves operation of the read transducer associated with the abnormality. In response to determining that the operation of the read transducer associated with the abnormality is improved, the read operation is continued using the read current with the reversed direction. An indication to use the read current with the reversed direction with the read transducer associated with the abnormality may be stored. In response to determining that the operation of the read transducer associated with the abnormality did not improve and/or became worse, the read operation continues using the read current with the original direction.

A drive-implemented calibration method according to one embodiment includes performing a read operation on a magnetic recording medium using a forward read current. During the read operation, the forward read current is ramped across a variety of values and read characteristics are detected. The direction of the read current is reversed to apply a reverse read current. During the read operation, the reverse read current is ramped across a variety of values and read characteristics are detected. The read characteristics are compared, and the value and read current direction that results in the best read characteristics is selected and stored.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 3 is a partial tape bearing surface view of a magnetic head having a write-read-write configuration.

FIG. 4 is a partial tape bearing surface view of a magnetic head having a read-write-read configuration.

FIG. 8A is a circuit diagram of a biasing circuit according to one embodiment.

DETAILED DESCRIPTION

Figure 1A:
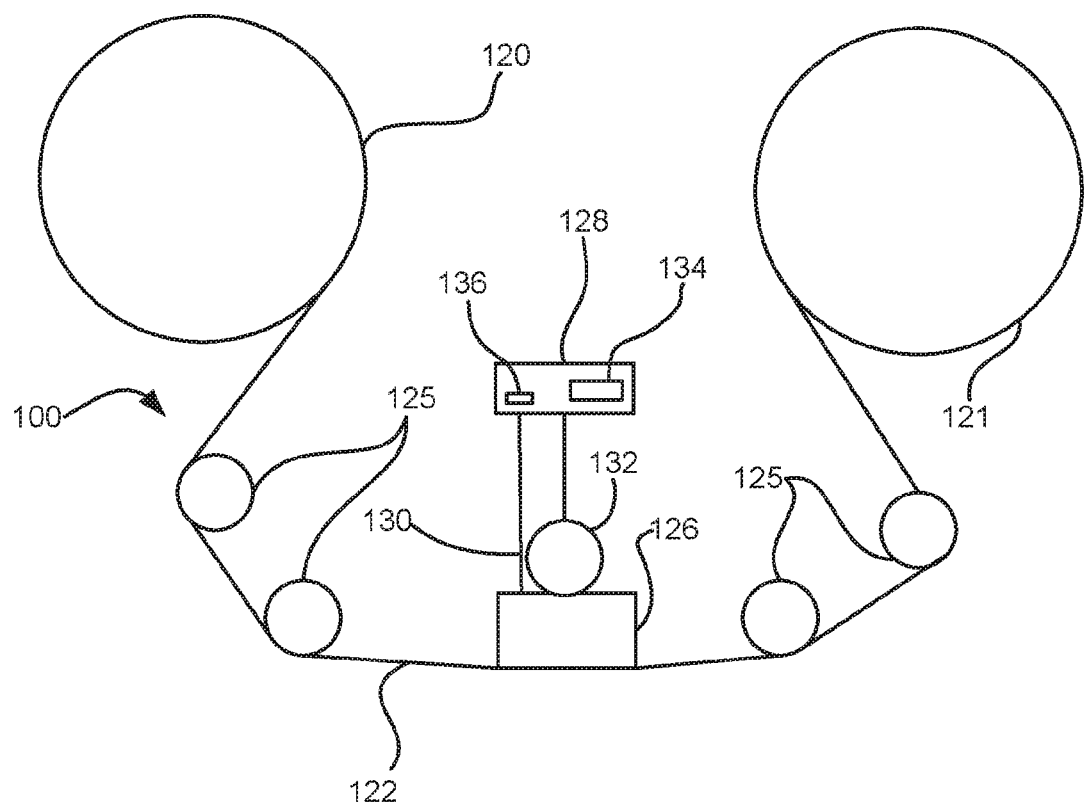
FIG. 1A is a schematic diagram of a simplified tape drive system according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

In one general embodiment, an apparatus includes a plurality of read transducers arranged in an array, and a plurality of biasing circuits. Each biasing circuit is coupled to a unique one of the read transducers. Each biasing circuit is configured to selectively reverse a direction of a read current applied to the read transducer associated therewith.

In another general embodiment, a drive-implemented method includes performing a read operation on a magnetic recording tape, and detecting an abnormality associated with a read transducer in an array of read transducers being used to perform the read operation. In response to detecting the abnormality, the read transducer associated with the abnormality is identified. A direction of a read current passing through the read transducer associated with the abnormality is reversed, and the read operation on the magnetic recording tape is continued or resumed using the read current in the reverse direction through the read transducer associated with the abnormality. A determination is made as to whether reversing the direction of the read current improves operation of the read transducer associated with the abnormality. In response to determining that the operation of the read transducer associated with the abnormality is improved, the read operation is continued using the read current with the reversed direction. An indication to use the read current with the reversed direction with the read transducer associated with the abnormality may be stored. In response to determining that the operation of the read transducer associated with the abnormality did not improve and/or became worse, the read operation continues using the read current with the original direction.

In yet another general embodiment, a drive-implemented calibration method includes performing a read operation on a magnetic recording medium using a forward read current. During the read operation, the forward read current is ramped across a variety of values and read characteristics are detected. The direction of the read current is reversed to apply a reverse read current. During the read operation, the reverse read current is ramped across a variety of values and read characteristics are detected. The read characteristics are compared, and the value and read current direction that results in the best read characteristics is selected and stored.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
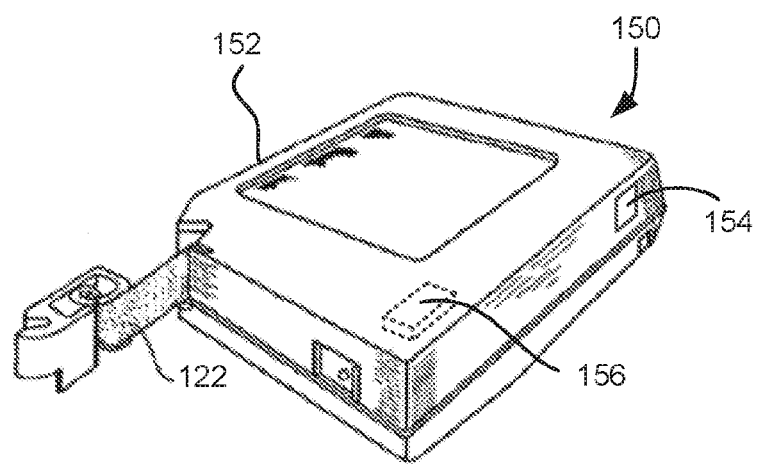
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or other device.

Figure 2:
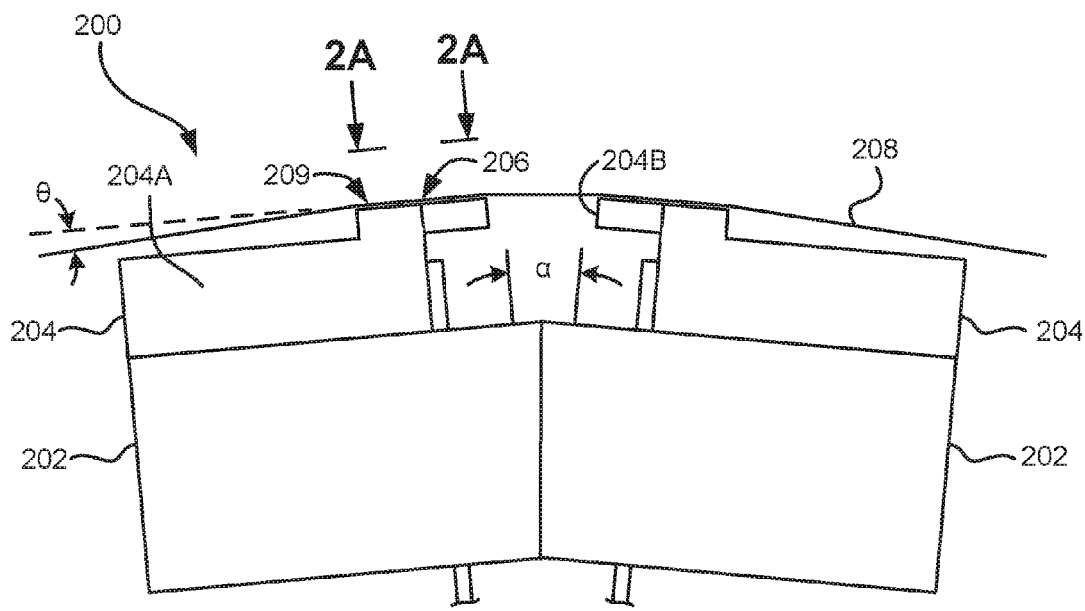
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2A:
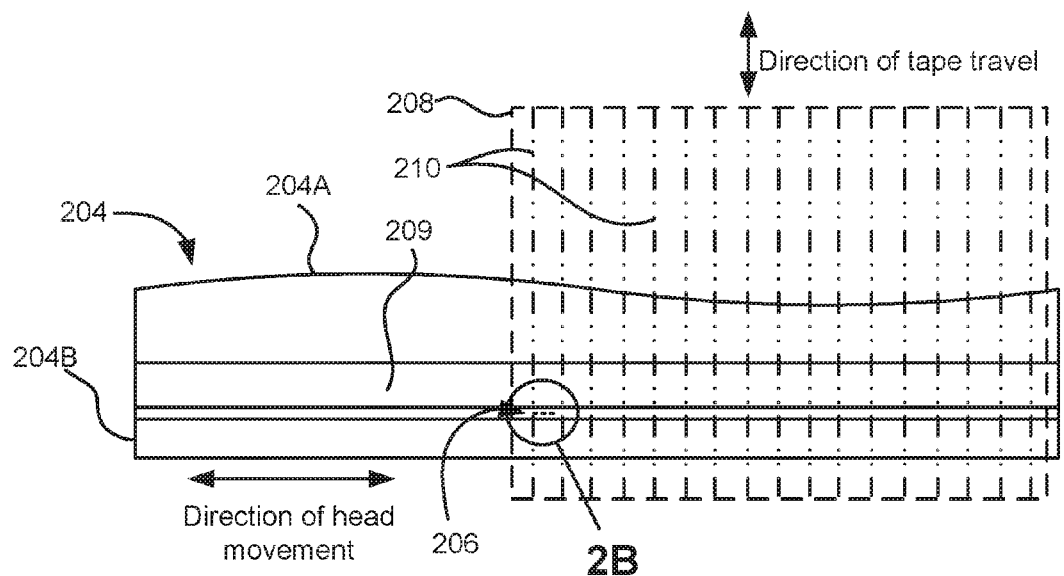
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2A on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2B:
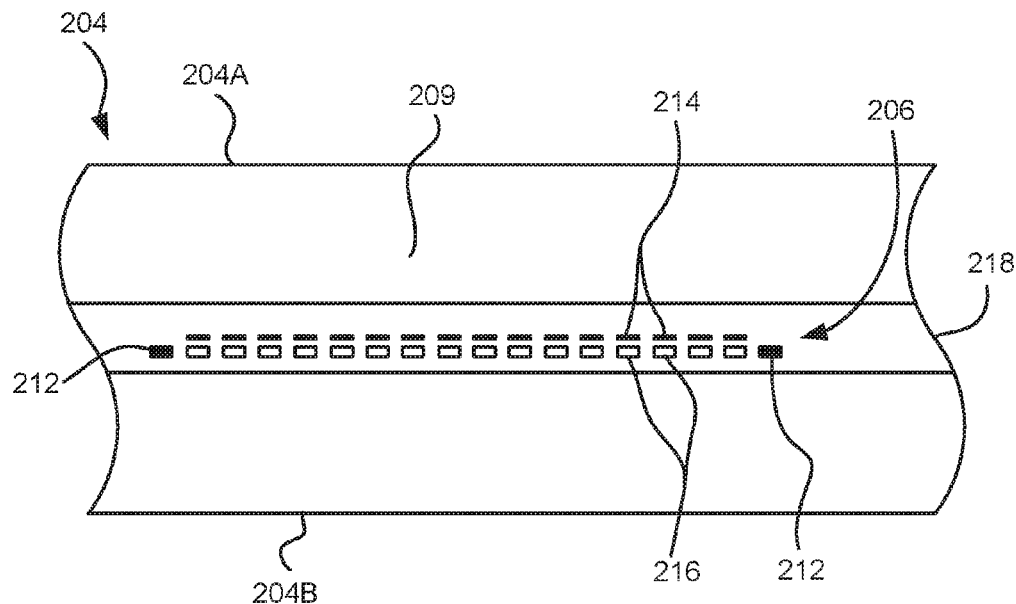
FIG. 2B is a detailed view taken from Circle 2B of FIG. 2A.

FIG. 2B depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
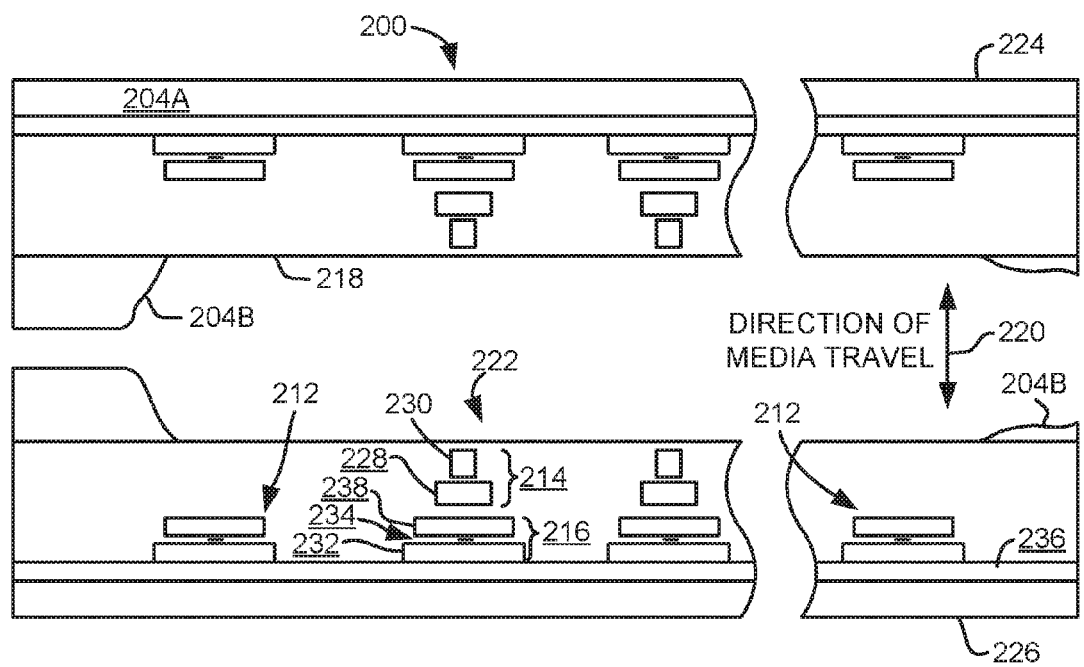
FIG. 2C is a detailed view of a partial tape bearing surface of a pair of modules.

FIG. 2C shows a partial tape bearing surface view of complementary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write transducer 214 and the readers, exemplified by the read transducer 216, are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (—), cobalt zirconium tantalum (CZT) or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
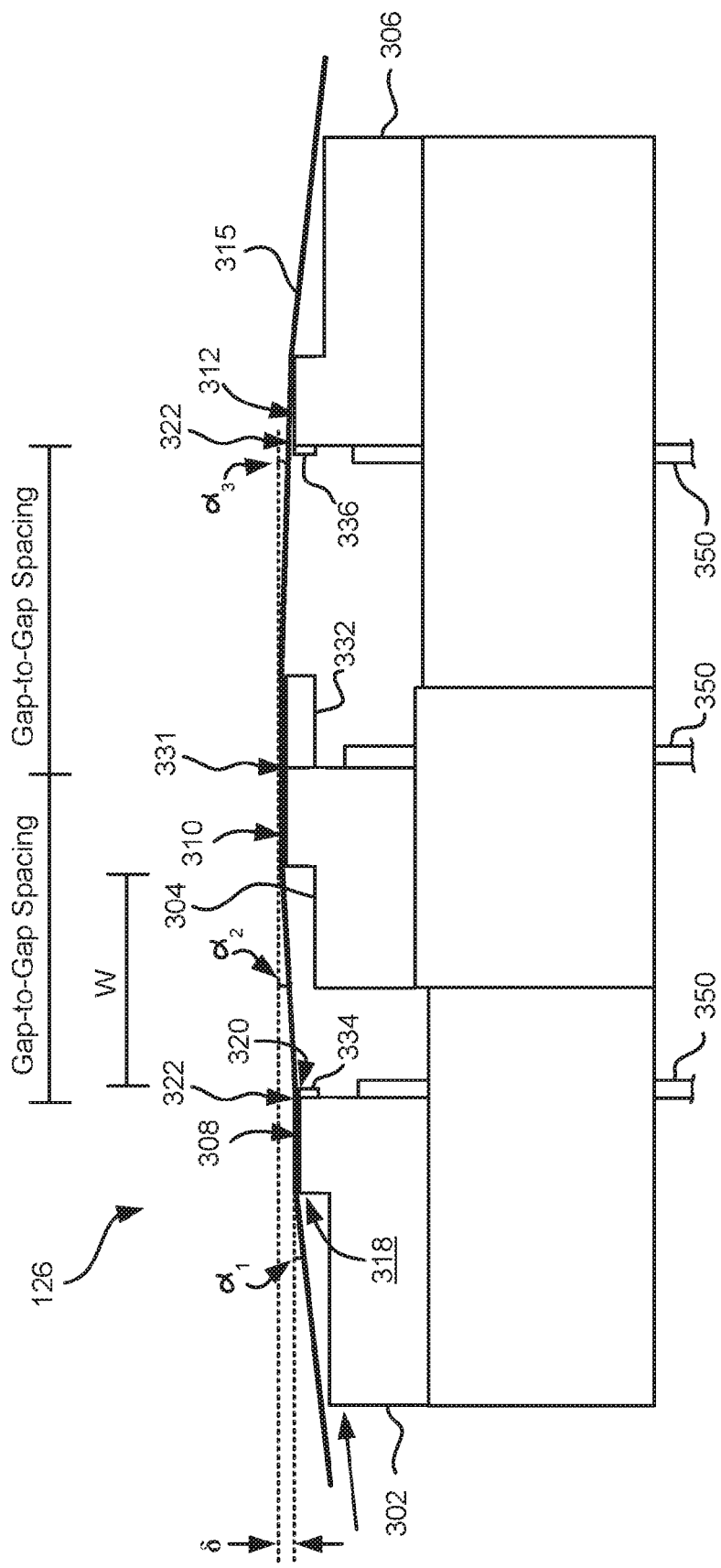
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
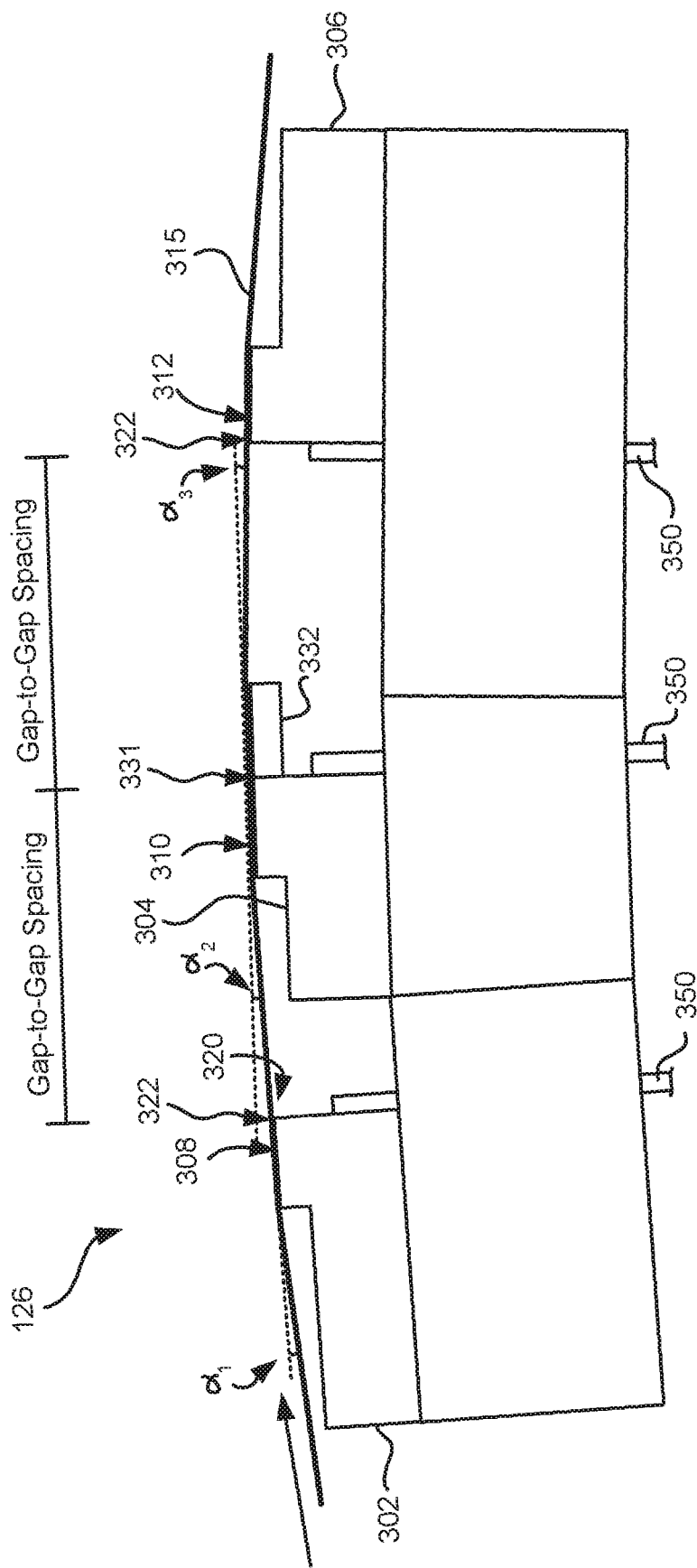
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used LTO tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
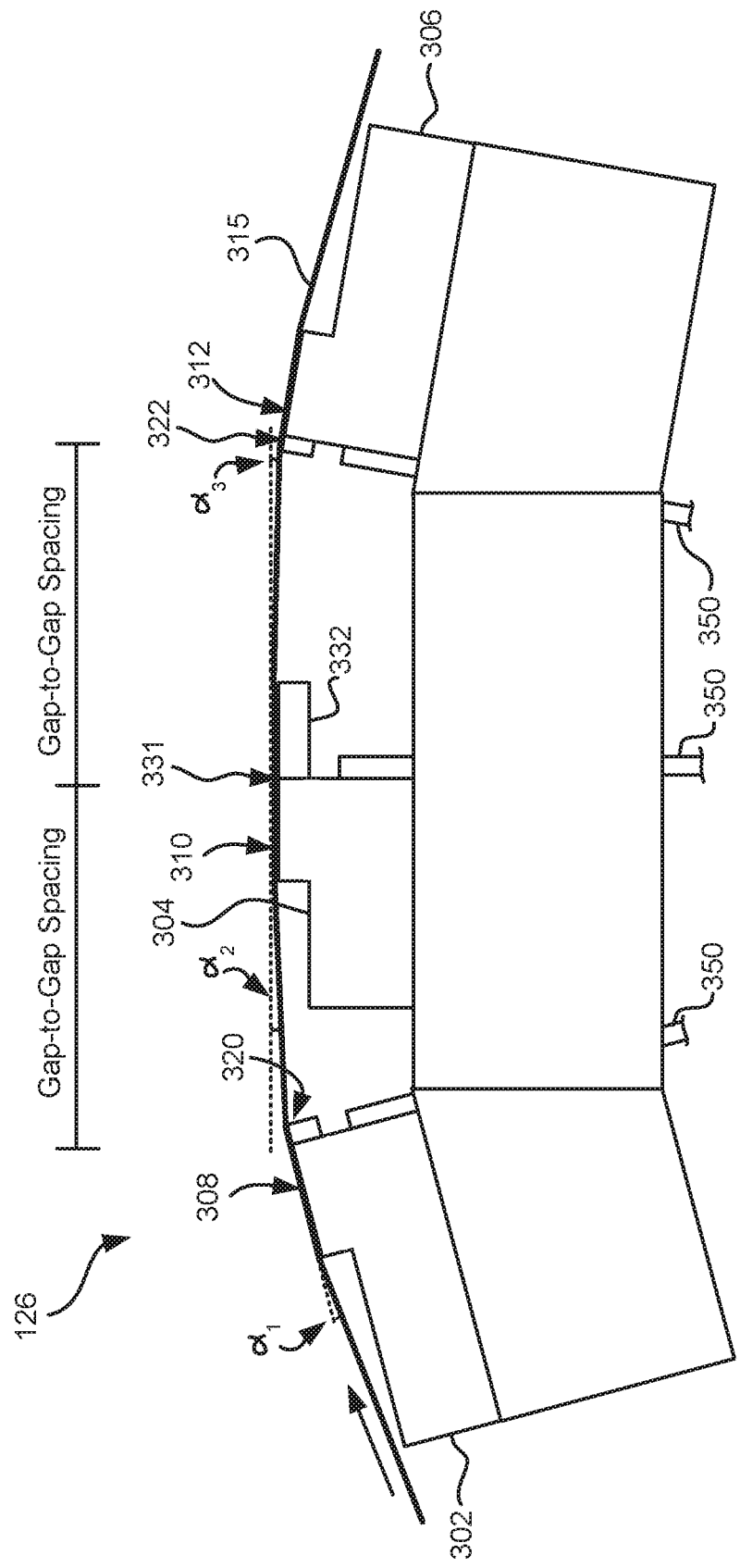
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various embodiments in conformance with the teachings herein, as would become apparent to one skilled in the art upon reading the present disclosure.

Magnetoresistive tape heads may experience magnetic instability, thereby resulting in poor signals being read from the transducers during drive operation. Moreover, methods to mediate or cure magnetic instability while the drive is being used in the field are rare. Currently, once a reader in a multi-channel tape recording head becomes intolerably unstable, there is no recourse and the track can no longer be read. If the instability affects a servo reader, then there may be permanent drive failure. Thus, it would be desirable to access an error recovery procedure that can be implemented when a reader or servo reader becomes unstable while the drive is in operation. Such an error recovery procedure preferably would target only specific readers that are unstable without affecting the other readers in the multi-channel tape recording head. Moreover, it would be desirable to have a reversible system, as opposed to legacy methods of passing a current pulse through a reader or servo reader as a means to improve or fix an unstable reader or servo reader, but may produce irreversible changes.

Various embodiments described and/or suggested herein overcome the foregoing challenges of conventional products, where a biasing circuit of an individual sensor may reverse direction of the current applied to the sensor under program control thereby enabling sensor optimization of individual tracks in a multi-channel device. Selective reversing of bias current in a multi-channel device may be used as both an error recovery procedure in the event of an unstable reader or as a calibration procedure to improve the amplitude or other performance aspects of individual tracks. For example, using a reverse bias on some tracks in a multi-channel device may lead to improved magnetic stability and, additionally, improved magnetic sensor response.

Figure 8B:
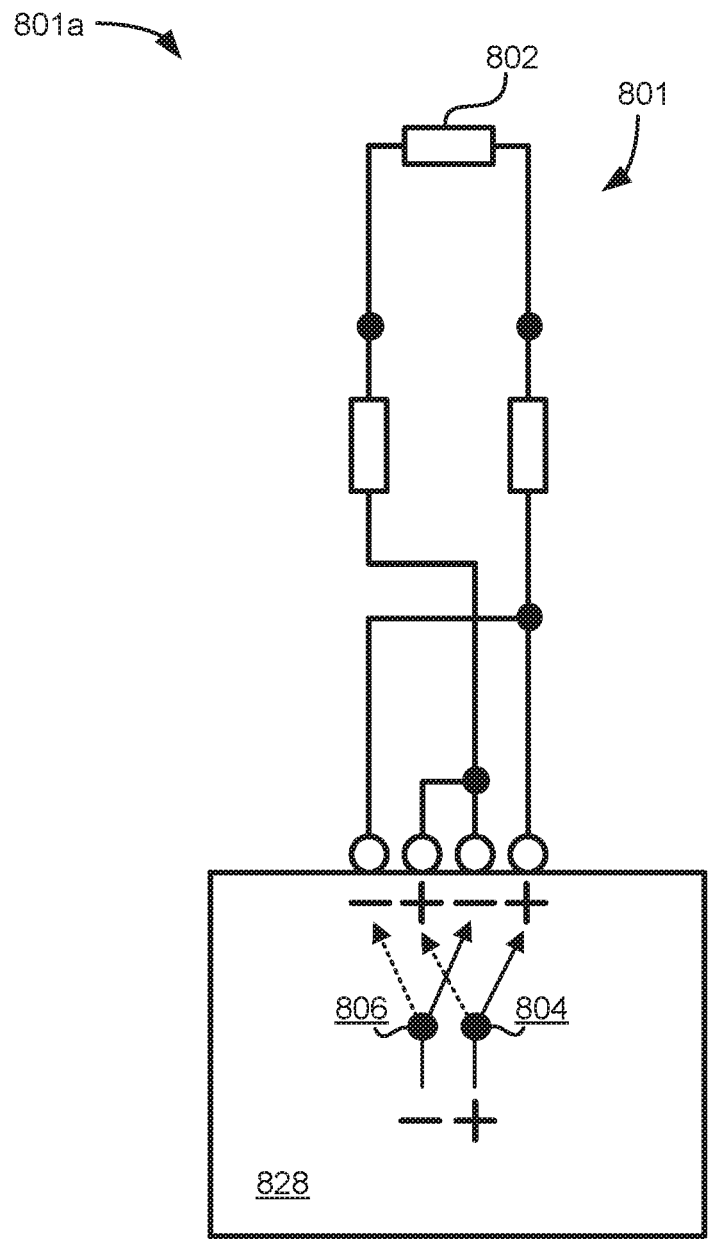
FIG. 8B is a detailed circuit diagram taken from circle 8B of FIG. 8A.

FIGS. 8A-B depict an apparatus 800 for a multi-channel tape recording head with a biasing circuit coupled to each reader transducer with one embodiment. As an option, the present apparatus 800 may be implemented in conjunction with features from any other embodiment listed herein, such as those described with reference to the other FIGS. Of course, however, such apparatus 800 and others presented herein may be used in various applications and/or in permutations which may or may not be specifically described in the illustrative embodiments listed herein. Further, the apparatus 800 presented herein may be used in any desired environment.

In one embodiment, as illustrated in FIG. 8A, a circuit provides a bias current to each read sensor of the tape head such that the input currents may be multiplexed. As shown in FIG. 8A, the circuit 801 has multiplexed inputs that may allow the current polarity to be selectively switched for each transducer 802 coupled to the circuit 801. In the original direction of current (solid arrows) the current passes through the transducer in the original direction, which is typically the design direction. In response to a logic command from the controller 828, the circuit switches 804, 806 may change the current flow through the transducer 802 to the reverse direction (dashed arrows).

In a preferred embodiment, as illustrated in FIGS. 8A-8B, a multi-channel tape recording head of the apparatus 800 includes a plurality of read transducers 802 arranged in an array 808; and a plurality of biasing circuits 801, where each biasing circuit may be coupled to a unique one of the read transducers (801*a*, 801*b*, 801*c* . . . 801*n* where n may be any number of a biasing circuit coupled to a unique read transducer). Moreover, each biasing circuit 801 is configured to selectively reverse a direction of a read current applied to the read transducer associated therewith. Furthermore, the controller module 828 may be configured to detect an abnormality with the operating characteristics of a read transducer 802 in an array 808 of read transducers, where the abnormality may be detected based on one or more of an error rate, e.g., bit error rate, being above a first threshold, a signal to noise ratio being below a second threshold, and an amplitude of a read signal being below a third threshold, and/or asymmetry (the measure of how large the positive excursions of a signal are relative to the negative excursions of the signal) being in a predefined range (e.g., above or below a threshold). A track abnormality may not adversely affect drive performance significantly. Rather, an abnormality may refer to a degraded performance of a given channel.

With further reference to FIG. 8A, a module 814 of the controller 828 may be configured to control the biasing circuits 801. For example, the controller module 814 may be configured to select the direction of the read current through each biasing circuit 801 based on detected operating characteristics of the read transducer 802 associated with the respective biasing circuit 801. The controller module 814 may be, for example, a processor, e.g., executing firmware, or some other logic module in the controller. Moreover, the controller module 814 may be configured to identify the read transducer 802 associated with the abnormality and reverse the direction of the read current, through toggle switches 804, 806 in the respective biasing circuit 801 of the read transducer 802 associated with the abnormality. Furthermore, in response to determining that the operation of the read transducer 802 associated with the abnormality is improved, the controller 814 may be configured to store in memory 836 an indication to use the read current with the reversed direction (dashed arrows, FIG. 8A) with the read transducer 802 associated with the abnormality.

In yet another embodiment, the controller module 814 of the apparatus 800 may be configured to determine whether operating characteristics of the read transducer 802 are improved at a reverse bias current. In one approach, the operating characteristics may be determined to be improved based a comparison of the operating characteristics of the read transducers in the array. Comparison of operating characteristics of the read transducer associated with the abnormality may include whether the error rate is below a first threshold, or the signal to noise ratio is above a second threshold, the amplitude of a read signal is above a third threshold, and/or asymmetry being in a predefined range. In response to the determination that the operating characteristics of the read transducer associated with the abnormality have improved, the controller may decide to continue the read operation using the read current with the reversed direction. In some cases, there has been, surprisingly, considerable improvement of the read characteristics of the read transducer with the current in the reverse direction. For example, the signal from a read transducer may be unsteady and noisy, and then as soon as bias current is reversed, the noise is removed and the signal is steady and/or the head output increases.

In some embodiments, the controller 814 may be configured to continue the read operation using the read current with the original direction (solid arrows, FIGS. 8A-B) in response to determining that either the operation of the read transducer 802 associated with the abnormality did not improve, became worse, or did not improve and became worse.

Figure 9:
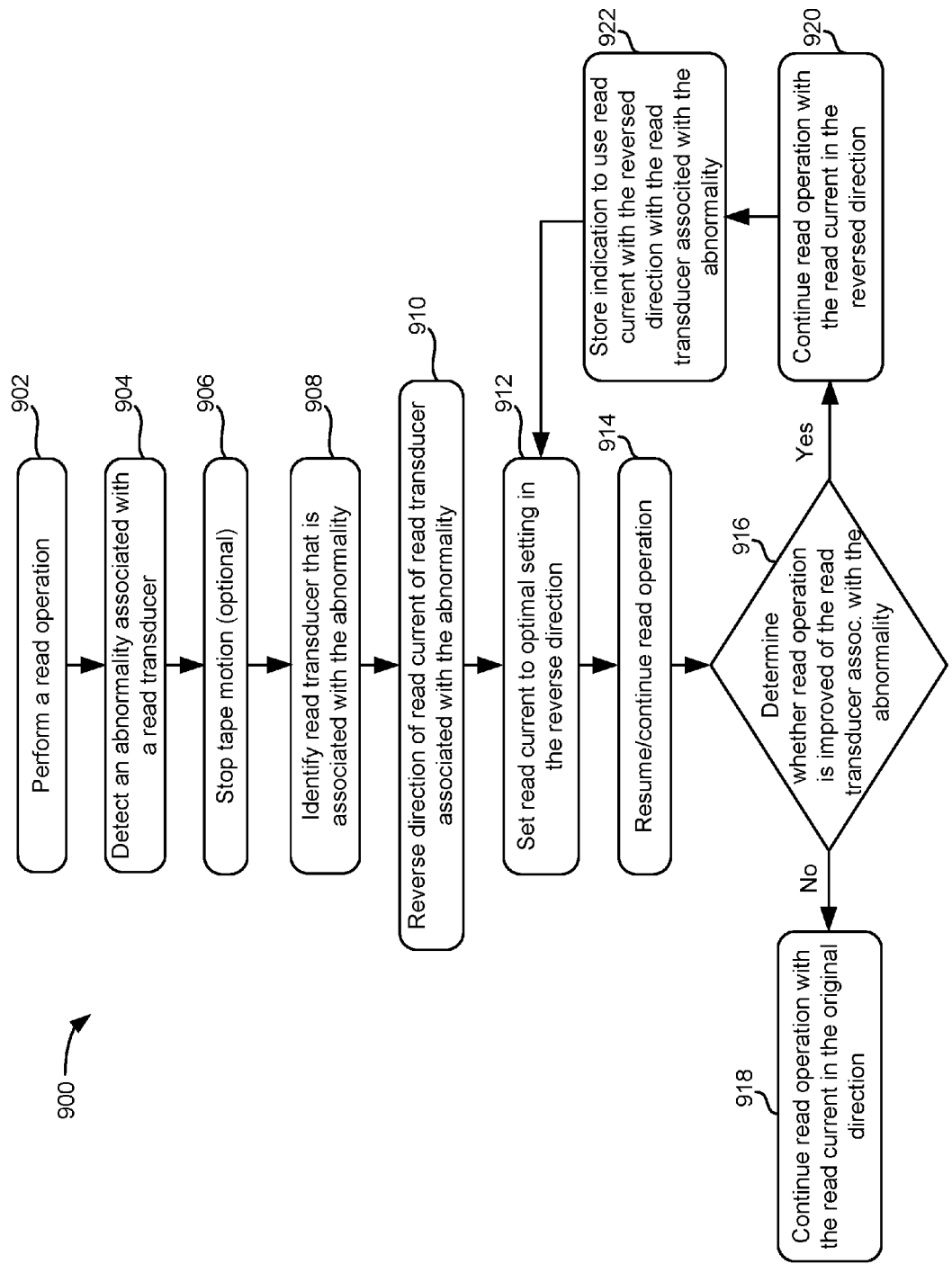
FIG. 9 is a flow diagram of a process according to one embodiment.

FIG. 9 depicts a flowchart of the method 900 for a reversing the direction of the current through an unstable read sensor according to one embodiment. As an option, the present method 900 may be implemented in conjunction with features from any other embodiment listed herein, such as those described with reference to the other FIGS. Of course, however, such method 900 and others presented herein may be used in various applications and/or in permutations which may or may not be specifically described in the illustrative embodiments listed herein. Further, the method 900 presented herein may be used in any desired environment. Of course, more or less operations than those specifically described in FIG. 9 may be included in method 900, as would be understood by one of skill in the art upon reading the present descriptions. Each of the steps of the method 900 may be performed using known techniques according to the teachings herein.

In the event that the drive detects that a reader is producing abnormally high errors and the signal to noise ratio falls below a tolerable threshold, the drive may implement a process that includes reversing the bias current through the unstable sensor. Reversing bias current through selected sensors has been shown to mediate magnetic instability and in some cases remove magnetic "hot" spots and "dead" spots in Magnetic Sensor Mapping (MSM) images, where MSM is a method of measuring the response of a sensor or its change in resistance in the presence of a magnetized scanning probe.

Referring to initial step 902 of FIG. 9, the method involves performing a read operation on a magnetic recording tape, followed by step 904 detecting an abnormality associated with a read transducer in an array of read transducers being used to perform the read operation. Reading may continue, reading may stop, and/or the tape motion may be stopped (see optional step 906) in response to detecting the abnormality.

With further reference to method 900 in FIG. 9, step 908 involves identifying the read transducer associated with the abnormality. An abnormality may be detected in a read channel based on comparing the read characteristics of each read transducer to the read characteristics of a group of read transducers in the array of read transducers. The abnormality may be (but is not necessarily) detected based on a comparison, where the comparison may include a determination of whether an error rate, e.g., bit error rate, is above a first threshold, a signal to noise ratio is below a second threshold, an amplitude of a read signal is above a third threshold, asymmetry being in a predefined range, and/or any determined error command provided by the controller or interface that provides communication between the tape and drive (see 134 and 136 of 100, FIG. 1A).

Furthermore, values of one or more of the thresholds used to indicate an abnormality associated with a transducer may be determined during the read operation based on reading characteristics of a group of the read transducers in the array. In one embodiment, the abnormality may be detected based on the error rate being above the first threshold. In another embodiment, the abnormality may be detected based on the signal to noise ratio being below the second threshold. In yet another embodiment, the abnormality may be detected based on the amplitude being below the third threshold. In a further embodiment, the abnormality may be detected based on asymmetry being in a predefined range In response to determining that there is an abnormality associated with a read transducer, step 910 involves reversing the direction of the read current passing through the read transducer associated with the abnormality. In one embodiment, the optional step 912 may be employed in which the read bias current may be set to an optimal setting in the reverse direction. In some approaches, the optimal setting of the read current may be determined in the reverse direction by ramping the read current across a variety of values and selecting the value that results in best read characteristics. In some cases, the amplitude produced by the reversed bias current can be significantly higher than the original direction of the current.

In some embodiments, the optimal setting may be retrieved from a previously stored indication, as shown in one embodiment in step 922, to use the read bias current with the reversed direction with the read transducer associated with the abnormality, where the indication to use a reverse bias current is stored somewhere, such as in the drive, in a library database, on the tape, in cartridge memory, etc. Normal operation, e.g., reading and/or writing, may be performed using the bias direction indicated in the stored setting. Such indication(s) may be stored for some channels or each channel. Such indication(s) may be stored during drive build, during or after a procedure such as methods 900 or 1000 (FIGS. 9 and 10), as part of a calibration, etc.

Method 900 proceeds to step 914 in which the read operation on the magnetic recording tape is continued, or resumed if tape motion was stopped or reading stopped, using the read current in the reverse direction through the read transducer associated with the abnormality.

Method 900 further includes a decision step 916 in which it may be determined whether reversing the direction of the read current improves operation of the read transducer associated with the abnormality. In some approaches, if the operation of the read transducer associated with the abnormality is improved, then the read operation continues using the read current with the reversed direction as shown in step 920. Moreover, proceeding to step 922, if the abnormality is improved with the read current in the reverse direction, indication to use the read current with the reversed direction with the read transducer associated with the abnormality may be stored in a memory, e.g., the drive memory.

In other approaches, if the operation of the read transducer associated with the abnormality did not improve and/or became worse, then the read operation will continue using the read current with the original direction as shown in step 918.

Figure 10:
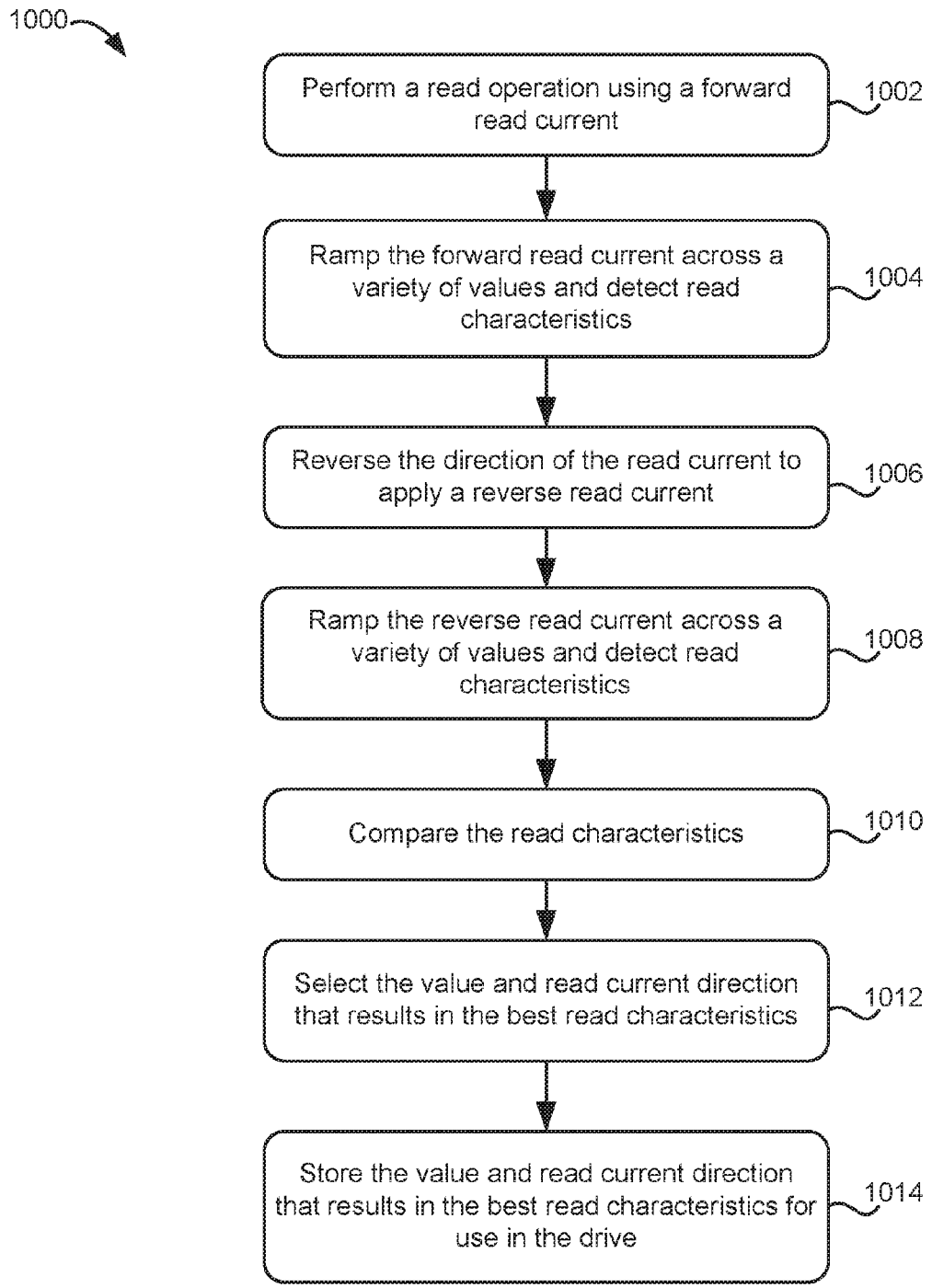
FIG. 10 is a flow diagram of a process according to one embodiment.

FIG. 10 depicts a flowchart of the method 1000 for a drive calibration procedure using reverse bias current according to one embodiment. As an option, the present method 1000 may be implemented in conjunction with features from any other embodiment listed herein, such as those described with reference to the other FIGS. Of course, however, such method 1000 and others presented herein may be used in various applications and/or in permutations which may or may not be specifically described in the illustrative embodiments listed herein. Further, the method 1000 presented herein may be used in any desired environment. Of course, more or less operations than those specifically described in FIG. 10 may be included in method 1000, as would be understood by one of skill in the art upon reading the present descriptions. Each of the steps of the method 1000 may be performed using known techniques according to the teachings herein.

Method 1000 as depicted in FIG. 10 begins with step 1002 in which a read operation is performed on a magnetic recording medium, for example, tape, using a forward read current. In some approaches, the calibration method may be performed for each of a plurality of read transducers in an array.

During the read operation, in step 1004, the forward read current may be ramped across a variety of values (e.g., current levels) and read characteristics are detected.

In preferred embodiments, the read characteristics of the read transducers may be determined to be best read characteristics based on a comparison, where the comparison may include error rate being below a first threshold, a signal to noise ratio being above a second threshold, an amplitude of a read signal being above a third threshold, and/or asymmetry being in a predefined range.

Method 1000 proceeds to step 1006 with reversing the direction of the read current to apply a reverse read current. During the reverse current read operation, in step 1008, the reverse read current may be ramped across a variety of values and read characteristics are detecting.

Step 1010 of method 1000 involves comparing the read characteristics of the read operation of the forward read current with the read characteristics of the reverse read current.

Following the comparison of read characteristics from forward and reverse read currents, in step 1012, the value and read current direction that results in the best read characteristics may be selected.

In step 1014, the value and read current direction that results in the best read characteristics for use may be stored in the memory of the drive.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. An apparatus, comprising:
a plurality of read transducers arranged in an array; and
a plurality of biasing circuits, each biasing circuit being coupled to a unique one of the read transducers,
wherein each biasing circuit is configured to selectively reverse a direction of flow of a read current applied to the read transducer associated therewith.

2. An apparatus as recited in claim 1, comprising a controller module configured to control the biasing circuits, the controller module being configured to select the direction of the read current through each biasing circuit based on detected operating characteristics of the read transducer associated with the respective biasing circuit.

3. An apparatus as recited in claim 2, wherein the controller module is configured to detect an abnormal operating characteristic associated with a read transducer in an array of read transducers, wherein the abnormal operating characteristic is detected based on one or more of an error rate being above a first threshold, a signal to noise ratio being below a second threshold, an amplitude of a read signal being below a third threshold, and asymmetry being in a predefined range; and in response thereto, reversing the direction of the read current.

4. An apparatus as recited in claim 3, wherein the controller module is configured to identify the read transducer associated with the abnormal operating characteristic.

5. An apparatus as recited in claim 3, wherein the controller module is configured to reverse the direction of the read current through the respective biasing circuit of the read transducer associated with the abnormal operating characteristic.

6. An apparatus as recited in claim 5, wherein the controller module is configured to determine whether operating characteristics of the read transducer are improved at a reverse bias current, wherein the operating characteristics are determined to be improved based on a comparison, the comparison being selected from a group consisting of: an error rate being below a first threshold, a signal to noise ratio being above a second threshold, an amplitude of a read signal being above a third threshold, and asymmetry being in a predefined range; and in response thereto, continue a read operation using the read current with the reversed direction.

7. An apparatus as recited in claim 6, wherein the controller module is configured to continue the read operation using the read current with the original direction in response to determining that: the operation of the read transducer associated with the abnormal operating characteristic did not improve, the operation of the read transducer associated with the abnormal operating characteristic became worse, or the operation of the read transducer associated with the abnormal operating characteristic did not improve and became worse.

8. An apparatus as recited in claim 6, wherein the controller module is configured to store an indication to use the read current with the reversed direction with the read transducer associated with the abnormal operating characteristic in response to determining that the operation of the read transducer associated with the abnormal operating characteristic is improved.

9. An apparatus as recited in claim 1, further comprising:
a drive mechanism for passing a magnetic medium over the array of read transducers; and
a controller electrically coupled to the array of read transducers.

10. A drive-implemented method, comprising:
performing a read operation on a magnetic recording tape;
detecting an abnormality associated with a read transducer in an array of read transducers being used to perform the read operation;
in response to detecting the abnormality, identifying the read transducer associated with the abnormality;
reversing a direction of a read current passing through the read transducer associated with the abnormality;
resuming or continuing the read operation on the magnetic recording tape using the read current in the reverse direction through the read transducer associated with the abnormality;
determining whether reversing the direction of the read current improves operation of the read transducer associated with the abnormality;
in response to determining that the operation of the read transducer associated with the abnormality is improved, continuing the read operation using the read current with the reversed direction;
in response to determining that the operation of the read transducer associated with the abnormality is improved, storing an indication to use the read current with the reversed direction with the read transducer associated with the abnormality; and
in response to determining that the operation of the read transducer associated with the abnormality did not improve and/or became worse, continuing the read operation using the read current with the original direction.

11. A drive-implemented method as recited in claim 10, wherein the abnormality is detected based on comparing read characteristics of each read transducer to read characteristics of a group of read transducers in the array of read transducers.

12. A drive-implemented method as recited in claim 10, wherein the abnormality is detected based on a comparison, wherein the comparison is selected from a group consisting of an error rate being above a first threshold, a signal to noise ratio being below a second threshold, an amplitude of a read signal being below a third threshold, and asymmetry being in a predefined range; wherein one or more of the thresholds are determined during the read operation based on reading characteristics of a group of the read transducers.

13. A drive-implemented method as recited in claim 12, wherein the abnormality is detected based on the error rate being above the first threshold.

14. A drive-implemented method as recited in claim 12, wherein the abnormality is detected based on the signal to noise ratio being below the second threshold.

15. A drive-implemented method as recited in claim 12, wherein the abnormality is detected based on the amplitude being below the third threshold.

16. A drive-implemented method as recited in claim 10, wherein an optimal setting of the read current is determined in the reverse direction by ramping the read current across a variety of values and selecting the value that results in best read characteristics.

17. A drive-implemented calibration method, comprising:
performing a read operation on a magnetic recording medium using a forward read current;
during the read operation, ramping the forward read current across a variety of values and detecting read characteristics;

reversing a direction of the read current to apply a reverse read current;

during the read operation, ramping the reverse read current across a variety of values and detecting read characteristics;

comparing the read characteristics;

selecting the value and read current direction that results in the best read characteristics; and storing the value and read current direction that results in the best read characteristics.

18. A method as recited in claim 17, wherein the calibration method is performed for each of a plurality of read transducers in an array.

19. A method as recited in claim 17, wherein the read characteristics are determined to be best read characteristics based on a comparison, wherein the comparison is selected from a group consisting of an error rate being below a first threshold, a signal to noise ratio being above a second threshold, an amplitude of a read signal being above a third threshold, and asymmetry being in a predefined range.

20. A method as recited in claim 17, wherein the magnetic recording medium is a magnetic tape.

* * * * *